(No Model.) 2 Sheets—Sheet 1.

W. HART.
HOISTING MACHINE.

No. 463,719. Patented Nov. 24, 1891.

Witnesses:
Robt. F. Gaylord
Frank B. Murphy

Inventor
Walter Hart
by Duncan & Page
Attorneys (No Model.) 2 Sheets—Sheet 2.

W. HART.
HOISTING MACHINE.

No. 463,719. Patented Nov. 24, 1891.

Witnesses:
Robt. F. Gaylord
Frank B. Murphy

Inventor
Walter Hart
by Duncan Page
Attorneys

THE NORRIS PETERS CO., PHOTO-LITHO., WASHINGTON, D. C.

UNITED STATES PATENT OFFICE.

WALTER HART, OF NEW YORK, N. Y.

HOISTING-MACHINE.

SPECIFICATION forming part of Letters Patent No. 463,719, dated November 24, 1891.

Application filed January 12, 1891. Serial No. 377,434. (No model.)

*To all whom it may concern:*

Be it known that I, WALTER HART, of New York, in the county of New York and State of New York, have invented certain new and useful Improvements in Hoisting-Machines, of which the following is a description, reference being had to the accompanying drawings.

The present invention relates particularly to improvements on that form of hoisting-machine shown in my United States Letters Patent No. 372,908, issued November 8, 1887.

The features of improvement consist of various constructions and adjusting mechanisms that I will now describe, and that will be specifically set forth in the claims to the following description.

Figure 1:
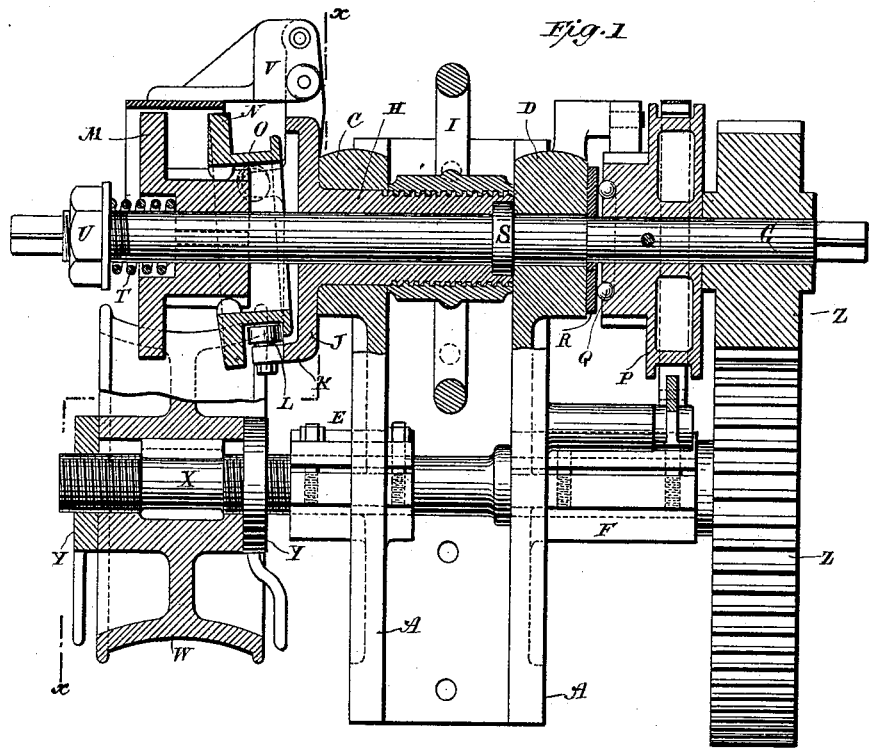
Figure 2:
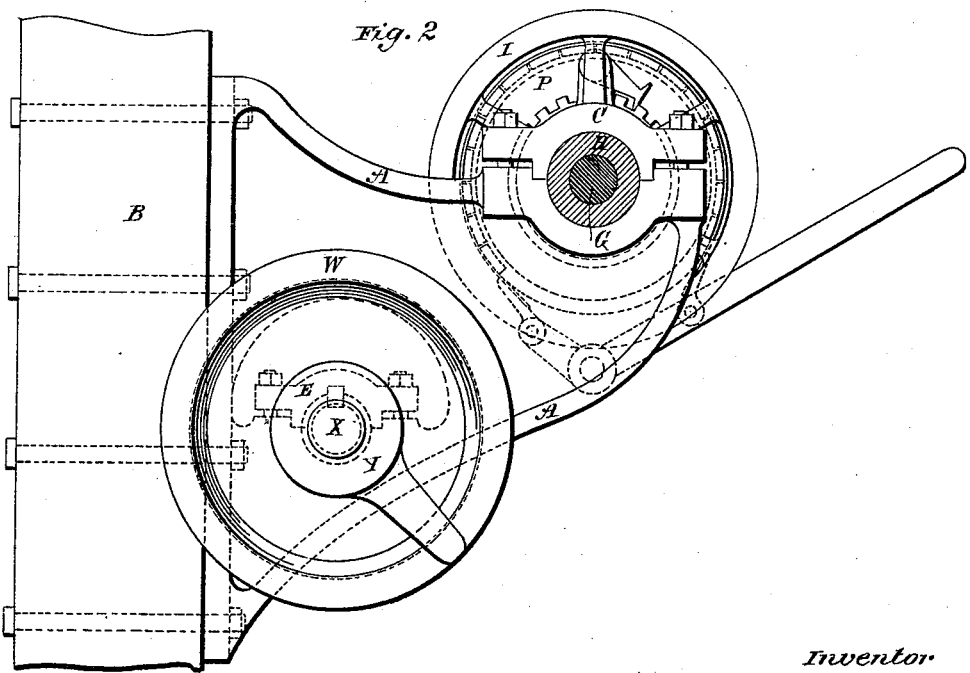
Figure 3:
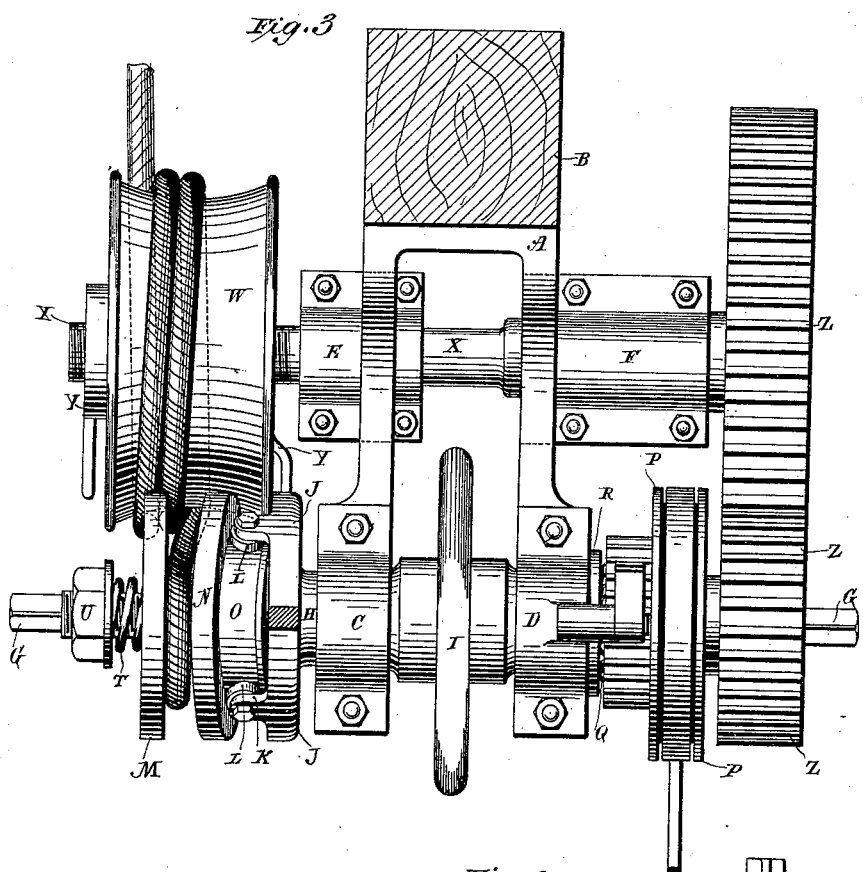
Figure 4:
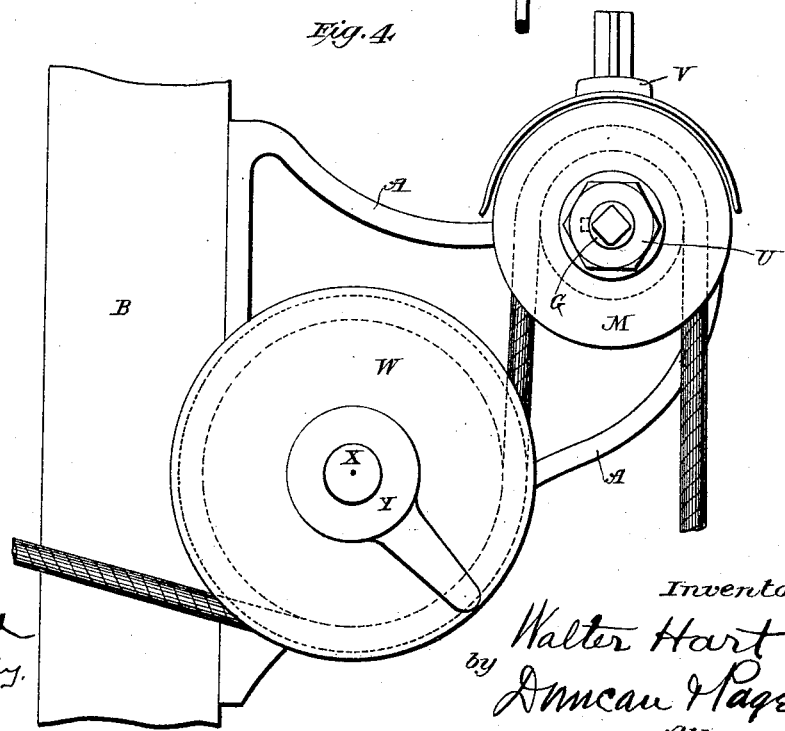

In the drawings, Figure 1 represents an elevation view of my improved mechanism in partial vertical longitudinal section. Fig. 2 is a cross-section of the same on plane $x\, x$ of Fig. 1. Fig. 3 is a plan view. Fig. 4 is an end view from the left-hand end of Figs. 1 or 3.

Referring to the views in detail, A represents the frame of the machine, which in the present machine is of bracket form and is secured to and supported on a pedestal or post B. The form of the main support or base, however, is not essential. The frame has two arms which are provided with four bearings C, D, E, and F, in the former of which is supported the clutch-driving shaft G, the ends of which are fitted to receive crank-arms for turning the same by hand, this particular form of hoist being adapted to be worked by hand. When mechanical power is to be used, gearing or other means for transmitting same will be provided connecting it with the engine or motor employed. This shaft is journaled directly in the bearing D and in the bearing C through the threaded sleeve H, which is feathered in the bearing or otherwise arranged to have longitudinal but not circular motion, and is given such longitudinal motion by the hand-wheel I, the hub of which is threaded to engage the sleeve and fills the space between the bearings C and D, so that turning the wheel causes the sleeve to move longitudinally on the shaft G. This sleeve H has at its left-hand end the disk-head J, from which project three longitudinal arms K, bearing friction-wheels L, which are in a common plane inclined to the axis of the sleeve.

M is a plain-faced disk having its hub mounted on the clutch-shaft so as to revolve therewith and having longitudinal motion thereon, the cylindrical face of the hub being provided with two or more longitudinal grooves.

N is a bevel or cone faced disk with a sleeve O, mounted upon the hub of the disk M and having projections entering the grooves in the hub of the same. The sleeve O of this disk N is circularly grooved, and in this groove run the friction-wheels L on the head of the longitudinally-moving sleeve H.

P is a brake-wheel fixed upon the clutch-shaft, the hub of which in one end is grooved and contains the friction-balls Q, which bear upon the face of the removable friction-plate R. This plate is made of hardened metal and protects the softer metal of the bearing D from being worn away. It also gives a smooth continuous surface on which the balls Q run and retains them in the channel in the hub P when the shaft G, with its attachments, is removed from between the bearings C and D.

S is a collar secured to the clutch-shaft, and which prevents this shaft from drawing through the bearing D when the clutch is open.

T is a spring arranged on the shaft between the disk M and a nut U. It serves to permit this disk to yield slightly, as when grasping a rope of uneven thickness.

V is a hood covering the disks and arranged to prevent the rope or cable leaving them.

It will now be plain that if a rope or cable be put between the disks and the inner one be forced up to the other until the rope is properly clamped turning the shaft will cause the rope to be drawn in between the disks from one side and paid out on the other—that is, the inclination of the axis of the conically-faced disk is such that its face is always along one radial line parallel to the face of the plain disk and gradually and equally recedes therefrom on opposite sides of such line, so that the space between the disks increases to a point diametrically opposite such parallel surfaces, and accordingly revolving the main shaft causes the coned disk to constantly approach and recede from the other, and a rope between them will by their motion be continuously clamped and loosened, drawn into the clutch on one side, and freed and dropped on the other side.

I have heretofore constructed such hoisting machinery so that the part that turns with the shaft and receives the thrust due to gripping the rope—the hub of the brake-wheel P in the present case—should bear directly upon one of the bearing-supports of the main shaft. This I have found caused not only considerable friction, but a rapid wearing of the bearing parts, and I therefore introduce in my present machine the ball-bearing Q R, employing particularly the plate R, which may be readily removed and substituted by another, as need be because of wear or the purposes of the adjustment of the parts on the shaft. The collar S is also an important part in this connection, particularly as it holds the parts of the ball-bearing properly together when the clutch is open and when without it the shaft might be moved lengthwise.

Heretofore I have secured the plain-faced or right-angled disk M fixedly upon its shaft. This I have found to be undesirable, in that when the disks are once set relatively to each other there is no compensation for varying thicknesses of the cable being operated by the disks. Another of the present improvements, therefore, is mounting this disk M so that it may yield under undue strain due to extra thickness of the cable or rope, as also to close up when upon parts of the rope that have not the thickness that the disks are adjusted to, and I do this by making the disk M longitudinally movable upon its shaft and provide a spring T, that is of proper elastic strength, in any given machine to compensate for the irregularities of thickness of the cable or rope to be worked. The presence of this spring and the resulting elastic clutch action also makes the machine run more smoothly, and so with less power and without tremor or vibration.

Another feature of improvement consists in providing the machine with an auxiliary drum or winch-head on which to coil the rope on its way to the clutch-disks and adapted to relieve the disks and their shaft of much of the direct strain of the load. W is such a drum or winch-head. It revolves with but has longitudinal motion on the shaft X, being adjusted along the same by handle-nuts Y. Its shaft is supported in the bearings E F in the bracket-frame supports A, which are connected to the clutch-shaft, as by the gearing Z Z. This drum is arranged in front of and just below the clutch-disks and takes the rope as it comes from the load or lead and delivers the same to the clutch, so that the rope is held well down upon and over the hub of the clutch, as seen in Fig. 4.

The gearing Z Z is so constructed and the size of the drum is such that the periphery of the drum has a movement substantially the same as that of the periphery of the hub of the clutch—that is, the rope is taken up by the clutch as rapidly as it unwinds from the drum. Preferably I arrange the parts so that the drum has a peripheral speed slightly in excess of that of the clutch-hub, so that there will be no severe straining between the drum and the clutch, as might be when a rope of irregular diameter is employed and that would therefore vary in the speed of unwinding from the drum. By these means I naturally lessen the direct strain of the load upon the clutch, and therefore am enabled to reduce, relatively, the size of the clutch parts. The drum also takes the jars and vibrations, if any there be, transmitted along the rope from the load, and so relieves the clutch in this respect. The drum also insures the delivery of the rope to the clutch at a constant and most advantageous angle and prevents any slipping tendency of the rope in the clutch, as well as the necessity for frequent adjustment of the clutch-disks. I have shown the drum as adjustable along its shaft and the peripheral surface of the drum as concave. The concave surface insures the rope always running off at the desired point, and the adjusting mechanism permits the drum being set on shaft X in consonance with the directions of the lead of the rope and in accordance with the demands of any particular case. It will therefore be seen that the strain on that part of the rope between the drum and the clutch is under easy regulation and the control of the operator.

These various features of improvement are susceptible of modified form, and accordingly I do not claim them as alone here shown, although the figures of drawings illustrate the forms I prefer.

What is claimed as new is—

1. The combination of the plain-faced disk M, having longitudinal motion on and revolving with the shaft G, the spring T and nut U, and the adjustable bevel-faced disk, all arranged substantially as and for the purpose set forth.

2. In combination with a disk-clutch composed of a plain-faced disk and a bevel-faced disk arranged to simultaneously revolve in different planes, a drum or winch head arranged to take the rope before its delivery to the clutch, the said drum having the same peripheral speed as the hub of the clutch upon which the rope bears, substantially as and for the purpose set forth.

3. In combination with a disk-clutch composed of a plain-faced disk M and a bevel-faced disk N, an adjustable drum or winch head having substantially the same peripheral speed as that of the hub of the disk M, substantially as and for the purpose set forth.

4. In combination with a disk-clutch composed of a plain-faced disk and a bevel-faced disk revolving together in different planes, a drum or winch head having a concave peripheral surface and turning with the clutch at substantially the same peripheral speed, and mechanism for adjusting the winch-head along its axis and relatively to the clutch, substantially as and for the purpose set forth.

WALTER HART.

Witnesses:
ROBT. F. GAYLORD,
FRANK B. MURPHY.